June 26, 1962  F. D. LASSWELL, JR  3,040,507
HARVESTERS

Filed July 8, 1958  2 Sheets-Sheet 1

Fred D. Lasswell, Jr.  INVENTOR.

BY *H. T. Sperry*

Fred D. Lasswell Jr  INVENTOR.

BY

United States Patent Office 3,040,507
Patented June 26, 1962

3,040,507
HARVESTERS
Fred D. Lasswell, Jr., 78 Adalia Ave., Davis Island,
Tampa, Fla.
Filed July 8, 1958, Ser. No. 747,275
15 Claims. (Cl. 56—328)

This invention relates to harvesters and is more particularly concerned with the picking and/or gathering of fruit and similar crops from trees, bushes and vines. While various aspects of the present invention may be applicable for the harvesting of crops of a wide variety of sizes, shapes, dimensions and growth forms, that form of the invention here shown by way of example is particularly designed for the picking of tree grown crops such as citrus fruit. The invention provides for the picking of fruit such as oranges, grapefruit, lemons, limes and the like by the pulling and/or twisting of the individual globes from their stem without the aid of manual manipulation, without injury to the fruit or the tree and in simultaneous multiple manner.

Automatic harvesting of fruit has long been an objective of the inventors and developers of agricultural equipment; however, problems of expeditious and economical severance of the articles from the tree without damage and undue manual manipulation or selective individual handling, have not heretofore been solved in a mechanism which lends itself to practical application. This invention provides a simple, effective and efficient instrumentality for the rapid simultaneous and/or successive severance and gathering such fruit, or the equivalent from it's normal attachment to shrub, vine or tree. The mechanism is readily portable to be moved from tree to tree and to a plurality of locations of operation at the individual trees. The device is also susceptible of remote or ground control to selectively direct the locus of activity from point to point with a minimum of physical labor or effort, and is well designed to meet the demands of economic manufacture and operation.

Figure 1:
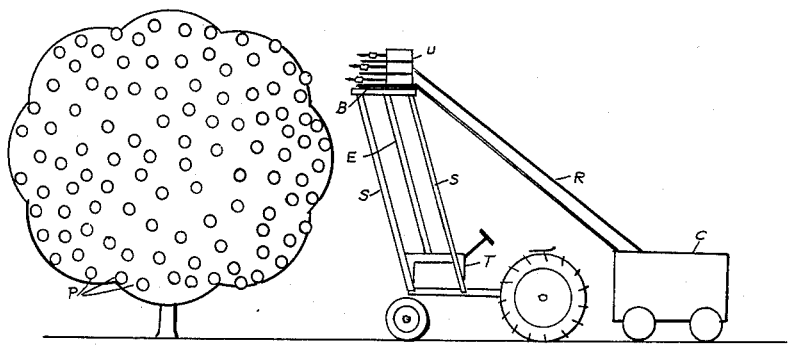
Figure 2:
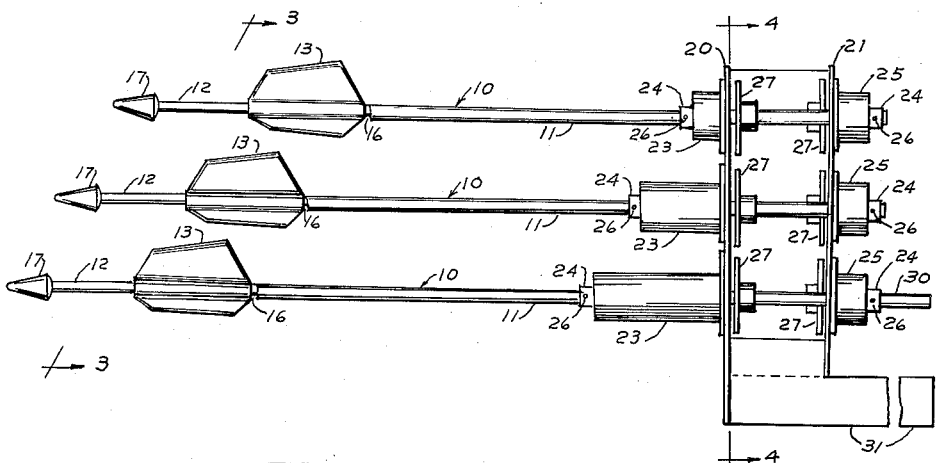
Figure 3:
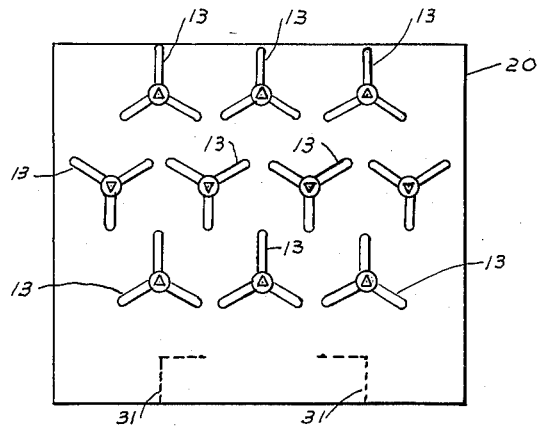
Figure 5:
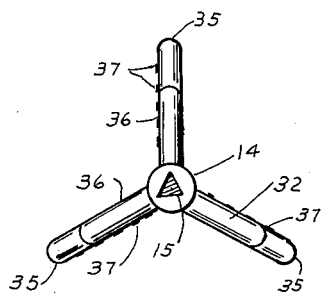
Figure 4:
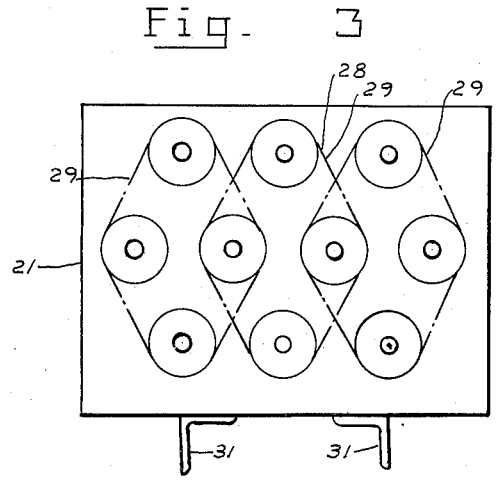

In the drawings:
FIGURE 1 is a schematic view illustrating one form of application and operation of the present invention.
FIGURE 2 is a detailed side elevation of a preferred form of harvester unit of the present invention.
FIGURE 3 is a sectional view taken on the line 3—3 of FIGURE 2.
FIGURE 4 is a sectional view taken on the line 4—4 of FIGURE 2.
FIGURE 5 is an end elevation of a picker head of the present invention, and
FIGURE 6 is a side elevation of the head illustrated in FIGURE 5.

Figure 6:
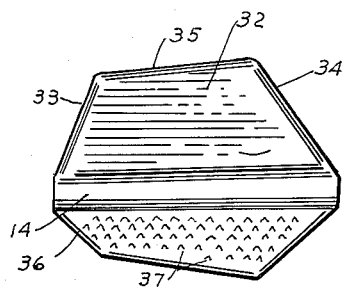

As illustrated in FIGURE 1, the invention embraces the concept of a harvester unit U; preferably in the form of the unit presented by FIGURES 2, 3 and 4, with heads as shown in FIGURES 5 and 6, to receive fruit therebetween and to disengage such fruit by rotary movement of such heads. However, the broad inventive concept of the invention is not limited or confined to the specific unit here presented nor to the design, construction or arrangement of the heads illustrated, notwithstanding the fact that the unit per se and/or the heads themselves constitute inventions individually appropriate for utility in other environments, combinations and associations with ancillary equipment. Therefore with respect to FIGURE 1, the invention contemplates a mobile supporting vehicle such as the tractor T or its equivalent, from which there rises a generally vertical boom assembly here shown in the nature of a parallelogram arrangement of standards S pivotally joined to the tractor T and similarly joined to a superstructure base B. The base B supports the unit U the arrangement being such that pivotal movement of the standards S with respect to the tractor T may locate the unit U selectively with respect to the vertical projection of the tractor thus to insert the unit into and through the external perimetral surface of a tree and withdraw it from such tree, bush or plant P for gathering the fruit F therefrom. Means such as a screw E operable by and controllable from the tractor T may adjust the vertical position of the base B and hence the unit U. Thus by bodily movement of the tractor T together with the pivotal movement of the standards, and the vertical adjustment of the unit, U, the unit may be moved to selected areas whereby such successive locationings will cause the unit to sever and gather the fruit to strip the tree without individual or manual manipulation of the fruit or branches and stems. Suitable receiving means R receives the picked fruit and guides or conveys it to appropriate receiving containers or trucks C.

Thus it will be seen that for this aspect of the total inventive concept, the invention provides a mobile support capable of maneuver in and about fruit trees to locate a horizontally and vertically adjustable gathering unit in gathering position with respect thereto. More specifically, in the present form of the invention, the support is ambulatory to facilitate bodily selection of the supporting position, while the boom assembly may be extended in whatever direction desired towards and from selected areas of a tree. The base B is axially adjustable along the boom assembly and carries the harvester unit for thrusting into or being retracted from such selected areas of the tree as desired regardless of vertical level, to gather the fruit therefrom. The guiding, or conveying means leads such gathered fruit to appropriate receiving means. Obviously the invention is not confined to structural details here suggested. The extension of the boom is not necessarily in a general upward direction from the horizontal plane of the mobile carrier, but may extend horizontally therefrom or downwardly where the crop is below the body of such carrier. Guided horizontal movement of the base may be by a single standard or other means rather than the parallelogramic arrangement here suggested and movement along the axis to locate the distance of gathering unit from the support may be other than the screw E. While the unit here contemplated is that of the type shown in FIGURES 2, 3 and 4, other equivalent mechanism may within the scope of this invention, be supported and manipulated in the general manner referred to. The harvesting unit as shown in FIGURES 2, 3 and 4 is slightly modified from the showing of the unit U in FIGURE 1.

Turning now to the structure and arrangement of the preferred gathering unit presented in FIGURES 2, 3 and 4, such unit may be generally defined as including a group of rotatable spindles arranged in parallel relation, each to rotate on its own axis. Upon each spindle there is mounted a picker head secured for rotation with the spindle. The picker heads are characterized by laterally extending contact elements shown in FIGURES 5 and 6, as equally spaced apart radial wings. Means are provided for rotating the spindles with their wings, preferably in synchronism and in the same direction. The spacing of the radial wings is preferably uniform with the axis of each spindle and each spindle is equidistant from the axis of each adjacent spindle. Such equal spacing is here achieved by the staggered relation of the spindle axes of parallel horizontal rows of spindles. The number of rows of any unit, and the number of spindles of each row may vary with the area of gathering to be accomplished upon each application of the unit and/or with the size and type of material gathered. The spindles constitute triangularly disposed groups of three. As here shown, each internal spindle of the whole assembly constitutes an apex of six surrounding triangular spindle groups.

The wings of the heads are so oriented with respect to the wings of associated heads, that at one phase in their rotation the triangular area formed between the sets of spindles will be open to admit fruit. Further rotation of the spindles will cause the wings to engage the fruit and sever it from the stem exerting a shearing torque or turning moment at substantially right angles to the stem. An important feature of the invention is the longitudinal displacement of adjacent heads with respect to the location of heads on adjacent spindles. A longitudinally staggered position of cooperating heads provides guidance and orientation of the fruit, with respect to its stem, to a centralized position between the spindles permitting their full entry between the heads as the triangular space is opened to receive it.

With more specific reference to the FIGURES 2, 3 and 4 it will be noted that the spindles are designated by the numeral 10 and constitute elongated, slender rods equally flexible as to length and preferably of durable material such as steel. In that form of the invention here shown, the inner shanks 11 of the spindles are of circular cross section and may be of uniform dimension. The outer free end portions 12 of the spindles are shown as of triangular cross section to receive and mount for rotation therewith the gathering heads 13 shown in detail in FIGURES 5 and 6. Each head is formed with a central longitudinally extending hub 14 defining a central longitudinally extending bore 15 of conforming angular section to that of the free end portions 12 of the spindles. Thus the heads, preferably of a resilient material in the nature of relatively hard rubber, may be fitted over the ends 12 and moved downwardly to engage the shoulder forming outer end 16 of the round shank 11 of the spindles 10. To facilitate such placement and securement of the heads, the ends 12 are tapered and since the heads 13 may be of resilient material, the frictional fit of their internal angular bores over the angular contour of the ends 12 may be sufficient for the retention of the heads as desired, and their rotation with the spindles. Supplementary securing means for the heads may, of course, be employed if desired. The outer terminal extremities of the spindles are preferably provided with guides 17 of conical form, which may assist the entry and penetration of the spindles through and between the twigs and branches of a tree, and assist in guiding the fruit, without damage, between triangularly related groups or spindles.

The arrangement of spindles here shown by way of example consists of three parallel horizontal rows; the upper and lower rows being of three spindles each, while the central row is of four spindles arranged in horizontally spaced apart position from the spindles above and below such that they are in staggered relation to the spindles of the upper and lower rows. Also, as here shown, the spindles are all of equidistant axes. The offset centers of the spindles in the middle row are located substantially midway between the spacing of the spindles in the upper and lower rows. Thus each adjacent group of three spindles define the apexes of equilateral triangles at least one side of which is common to the similar triangle defined by adjacent groups of spindles. It will of course be understood that the invention is in no way limited to any such number of rows of spindles or spindles in such rows. In this respect, the present concept is concerned with the provision of closely grouped sets of triangularly arranged spindles defining an entry area for fruit, whereby the fruit may be engaged by the picker heads to be gathered by and with the rotation of the spindles. The regular succession of such triangular groups as here formed by the uniformly spaced rows of uniformly spaced spindles illustrates a preferable means of securing such groupings where uniform and contiguous relation of the triangular groups is desired.

For mounting and driving the spindles 10 with synchronous unidirectional rotation, spaced mounting plates 20 and 21 are provided, disposed in parallel relation in spaced planes normal to the direction of the axes of the spindles. Spindle drive ends 22 formed integrally with the shanks 11 extend through the plates. Each spindle is provided with a forward stop collar 23, secured thereto as by a set screw 24, and adapted to bear against the forward face of the forward plate 20. A similar rear stop collar 25 is provided at the terminus of the ends 22, to bear against the opposite outer face of the rear plate 21. Intermediate the plates 20 and 21 the spindle drive ends 22 are provided with at least one sprocket 27, secured thereto by which rotation is imparted to each spindle. In the arrangement here shown each end bank of four spindles is driven by a single sprocket chain 28 as in FIGURE 3, the sprockets and chains being located forwardly between the plates and thus adjacent the forward plate 20. The intermediate central upper and lower spindles are driven by a chain 29 as in FIGURE 4, which chain also engages second sprockets on the central spindles of the first mentioned groups of four. One of the spindles, here shown as the center spindle of the lower row, is formed with an extended shaft 30, for receiving a driving connection, not shown, by which primary rotation is imparted. By this arrangement each spindle, and therewith each head, is rotated in the same direction and at the same speed as each other spindle and head. The plates 20 and 21 are mounted together in any suitable manner as by the angle irons 31 to constitute a unitized super structure as indicated at U in FIGURE 1, and as hereinbefore discussed. It will of course be understood that other equivalent driving means may be substituted for the chain drive described above.

The individual gathering or harvesting heads 13 as shown in FIGURES 5 and 6 have extending radially from their hubs 14, equally spaced wings 32 angularly related in radial directions from the hubs at one hundred and twenty degrees. The forward or leading edge 33 of each wing 32, is shorter than its opposite inner trailing edge 34, and is inclined towards the plates 20 and 21, opposite the edge 33 which extends further outward from the hub and inclines forwardly to provide for an inclined side edge 35 of increasing radius from the hub from front to rear. The maximum radial extension of the wings is shown as less than one-half the distance between spindle centers so that no danger of contact between wings of adjacent spindle heads is permitted. It is important to note that the extended radius of the trailing portion of the wing provides an increased flexibility of such portion to induce a spiral action facilitating the disengagement of the fruit from the stem. The inventive concept contemplates however, that such wings may exceed such total radial extension whereby upon axial orientation of related heads for rotational interdigitation they may pass between each other where the harvesting technique indicated such desirability.

In the present construction, orientation of the heads on the associated spindles is such that in the rotation of adjacent heads, the successive wings successively move into substantially octagonal alignment to form successive open octagonal spacings for the admission of fruit between the triangular groups of spindles. It will be noted that the one hundred and twenty degree relation of the wings of each head conforms octagonally with the one hundred and twenty degree included angles of the sides of the triangles defined by each set of three associated spindles. Since the spindles and heads are rotating in the same direction and at uniform speed, it will be seen that the triangular space between spindle centers is uniformly diminished as between head edges 35 as such edges move with the wings to a central position where they radiate from a line defined by the central axis of such triangle formed between the sets of three associated spindles. In such position fruit which has entered the triangular space is twisted and forced from its attaching stem to be plucked from the tree, by applying torque at right angles to the axis of the stem. Contact with the fruit is, of course, provided by the leading side face 36 of each successive wing. For insuring adequate frictional contact with fruit such faces 36 may be serrated as indicated at 37.

An important feature of the present invention is the staggered relation of the heads of adjacent spindles with respect to a plane parallel to that of the cones 17 and/or in relation to their relative position along the length of each spindle. Thus, as more clearly shown in FIGURE 2, the heads of the upper horizontal row of spindles are relatively closer to the plate 20 than those of the central horizontal row. Likewise those of the lower row are outwardly located on their spindles from those of the center row. Spindle stop collars 23 are here shown as of compensating variable axial length to insure uniform flexibility of the spindles. It will be noted however that the relation is an overlapping one at least some portion of all heads being in a common plane normal to the axes of the spindles. While such overlapping staggered relation may vary to meet the demands of varying conditions, it is here proposed that the relation of heads on parallel rows of spindles be at a bodily displacement corresponding to a plane taken at a sixty degree angle through the spindle axes. Such offset allows full engagement of the fruit by the wings before the possibility of stem engagement by the wings. This relation of the heads also provides proper alignment of the stem in a relatively vertical position prior to the final application of the severing torque. Thus by staggering, the fruit entering the triangular space formed between the spindles will be first contacted by the wings of the heads of the lower spindles. Such contact will be followed by successive contact by the wings of the intermediate heads, the innermost heads contact the fruit last. Such successive contacts will tend to induce a rotary motion of the fruit with respect to their stems, and will orient the fruit towards the center of the triangular space where it may be most effectively severed from its stem.

The unit U of FIGURE 1, preferably constituted by the spindles 10 with their heads 13 and guide cones 17 is provided with a partially surrounding fruit receiving and guiding shroud including spaced parallel fingers communicating with a conveying chute or trough, by which fruit picked will be received and conveyed as desired.

From the foregoing it is believed that the operation as well as the structure of the apparatus will be fully understood by those skilled in the art. Suffice it therefore to recapitulate by merely stating that the mobile support is operated to selectively thrust the unit U through the external peripheral surface of the tree into the fruit bearing areas thereof, the rotating spindles 10 will receive the fruit therebetween as the triangular space alternately is opened and closed by the continuous movement of the lated wings.

The cones 17 assist in directing the fruit to such triangular spaces and the wings in their rotation twist the fruit from its stem securement with the tree as aforesaid. The staggered relation between adjacent heads assists in the twisting and orienting of the fruit to more efficiently and expeditiously provide for final severance. Upon severance the fruit tumbles down through the vertically staggered spindles in a retarded fashion and is received by the shroud to be guided by the conveyor or chute R to receivers of such type as may be desired. It will of course be understood that the structure here presented is by way of exemplification rather than defining structural details limiting or confining the invention. Therefore numerous changes, modifications and the full use of equivalents may be resorted to the practice of the invention without departure from the spirit or scope of the appended claims.

I claim:

1. A tree penetrating fruit harvesting unit including a support, or plurality of rotating fruit engaging spindles mounted on said support, said rotary spindles arranged to form a plurality of triangularly related sets of spindles.

2. A harvesting unit as set forth in claim 1 in which the plurality of rotating fruit engaging spindles are spaced equidistant from each other and are arranged on said support to form a plurality of triangularly related sets of spindles, and means rotating said spindles simultaneously in the same direction.

3. A device as set forth in claim 2 in which each spindle includes a harvesting head mounted for rotation therewith and characterized by three radially extending wings, each wing having oppositely inclined end edges and a side edge inclined with respect to the axis of the head, the wings of the heads of adjacent spindles being oriented to present the wings of one head in colinear relation to the wings of an adjacent head during rotation thereof, the heads of adjacent spindles being disposed in longitudinally staggered relation, and a guide cone at the end of each of said spindles.

4. A tree fruit harvester comprising a support, a fruit harvesting unit carried on said support for movement with respect thereto, said fruit harvesting unit having a plurality of rotating spindles, means moving said fruit harvesting unit to a position within and penetrating the external surface of a fruit tree and means on adjacent rotating spindles for engaging fruit at spaced positions on the fruit to effect a removal of the fruit by rotating the fruit.

5. A device as set forth in claim 4 in which the plurality of rotating spindles are arranged in a stepped relationship whereby when the fruit is removed it tumbles downwardly in a retarded fashion to the bottom of said plurality of rotating spindles.

6. A tree fruit harvester comprising a mobile support capable of maneuvering in and about fruit trees, a tree penetrating fruit harvesting means mounted on said mobile support for horizontal and vertical adjustment with respect to said mobile support to affect an inserting of said fruit harvesting means into and out of a fruit tree, said tree penetrating fruit harvesting means comprising a plurality of rotating spindles, and said spindles having fruit engaging flexible fins thereon whereby penetration of a fruit tree is made with said fruit harvesting means to cause a stripping of fruit from said tree by the flexible fins engaging and spinning the fruit loose from the tree.

7. A device as set forth in claim 6 in which the plurality of spindles are arranged parallel to one another and forming regular horizontal rows with alternate rows offset horizontally to provide stepped vertical rows for downward retarded tumbling of freed and harvested fruit.

8. A tree fruit harvester comprising a panel member, means journalling a plurality of spindles in said panel member and all having their outer ends projecting from one side of said panel member, fruit engaging fins on said spindles, and means rotating said spindles by their ends in said panel member.

9. A device as set forth in claim 8 in which said fruit engaging fins are generally radially disposed on said spindles and are made of a flexible material.

10. A device as set forth in claim 9 in which said fins recede rearwardly from a position at said spindle surface to a position spaced from said spindle surface.

11. A device as set forth in claim 8 in which said rotating spindles are provided with conical guides to facilitate entry of the rotating spindles into a tree from which fruit is to be harvested.

12. A device as set forth in claim 8 in which said spindles are arranged in a staggered geometric pattern whereby tree loosened fruit is tumbled down and over said spindles in a retarded manner.

13. A tree fruit harvester comprising a support, a fruit harvesting unit carried on said support for movement with respect thereto, said fruit harvesting unit having a plurality of spindles thereon, means moving the fruit harvesting unit toward a fruit bearing tree so that the spindles thereon penetrate the external surface of the tree, fruit engaging fins mounted on said spindles, certain of said fins from spaced apart spindles arranged to engage intermediately disposed fruit at spaced positions thereon, and means causing said fins to have relative fruit twisting movement therebetween.

14. A tree fruit harvester comprising a support, a fruit harvesting unit carried on said support and movable to a position adjacent a fruit bearing tree, a plurality of fruit grasping and twisting means carried on said fruit harvesting unit, and means moving the plurality of fruit grasping and twisting means within the tree and adjacent the branches and fruit for removing fruit from the tree.

15. A device as set forth in claim 14 in which the fruit grasping and twisting means includes peripherally spaced apart fruit engaging elements.

References Cited in the file of this patent

UNITED STATES PATENTS

| | | |
|---|---|---|
| 220,607 | Ham | Oct. 14, 1879 |
| 241,406 | Nixon | May 10, 1881 |
| 464,852 | Canuteson | Dec. 8, 1891 |
| 1,077,640 | Randall | Nov. 4, 1913 |
| 1,472,262 | Abildgaard | Oct. 30, 1923 |
| 1,626,068 | Bartlett | Apr. 26, 1927 |
| 1,646,594 | Phelps et al. | Oct. 25, 1927 |
| 2,650,464 | Bernheim | Sept. 1, 1953 |
| 2,657,514 | Rust | Nov. 3, 1953 |
| 2,685,773 | Dauenhauer | Aug. 10, 1954 |
| 2,770,937 | Huddle | Nov. 20, 1956 |
| 2,829,814 | Warner | Apr. 8, 1958 |